US012286825B2

(12) United States Patent
Lin et al.

(10) Patent No.: US 12,286,825 B2
(45) **Date of Patent: *Apr. 29, 2025**

(54) HINGE

(71) Applicant: FOSITEK CORPORATION, New Taipei (TW)

(72) Inventors: Kuan-Yu Lin, New Taipei (TW); Hsiu-Fan Ho, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 57 days.

This patent is subject to a terminal disclaimer.

(21) Appl. No.: 18/095,898

(22) Filed: Jan. 11, 2023

(65) Prior Publication Data

US 2024/0151080 A1 May 9, 2024

(30) Foreign Application Priority Data

Nov. 4, 2022 (TW) ................................ 111142305

(51) Int. Cl.
*E05D 3/02* (2006.01)
*E05D 5/12* (2006.01)
(Continued)

(52) U.S. Cl.
CPC ................. *E05D 3/02* (2013.01); *E05D 5/12* (2013.01); *E05D 11/06* (2013.01); *E05D 11/082* (2013.01); *E05D 2003/027* (2013.01)

(58) Field of Classification Search
CPC . D05D 3/02; D05D 5/12; D05D 11/06; D05D 11/082; D05D 2003/027;
(Continued)

(56) References Cited

U.S. PATENT DOCUMENTS 494,549 A * 4/1893 Clement ............... E05D 11/082 16/342
1,166,551 A * 1/1916 Simmons .............. E05D 11/082 217/57

(Continued)

FOREIGN PATENT DOCUMENTS

DE 19707629 A1 * 10/1997 ............. E05D 5/128
JP 2001220939 A * 8/2001
TW 812536 B1 * 8/2023 ............. E05D 11/08

*Primary Examiner* — Jason W San
*Assistant Examiner* — Matthew J Sullivan
(74) *Attorney, Agent, or Firm* — Demian K. Jackson; Jackson IPG PLLC

(57) ABSTRACT

A hinge includes a seat, a shaft, a swivel bracket and at least one limiting bar. The seat includes two support portions. An accommodation area is defined between the two support portions. The two support portions are respectively provided with a shaft hole. The two shaft holes are arranged coaxially and connected to the accommodation area. The shaft includes a coupling section and two pivoting sections. The coupling section is located between the two pivoting sections. The two pivoting sections are respectively provided in one of the two shaft holes in a rotatable manner, and the coupling section is in the accommodation area. The swivel bracket includes a mounting plate, a sleeve piece and at least one extension portion. The mounting plate includes an inner surface, an outer surface, and a bottom edge. The sleeve piece extends from the bottom edge of the mounting plate and is wound at a side corresponding to the inner surface. The sleeve piece is configured to be sleeved over and fixed to the coupling section, such that swivel bracket is fixed to the shaft and rotatable with respect to the seat to move the inner surface to face the accommodation area. The extension portion is adjacent to lateral edges of the sleeve piece and extends from the bottom edge and is bent towards the side corresponding to the inner surface. The limiting bar is
(Continued)

disposed on one of the two support portions and is in the accommodation area. The limiting bar is in a rotational path of the extension portion. When the swivel bracket is flipped outward with respect to the seat, the extension portion moves towards the limiting bar.

10 Claims, 10 Drawing Sheets

(51) Int. Cl.
*E05D 11/06* (2006.01)
*E05D 11/08* (2006.01)

(58) Field of Classification Search
CPC ......... D05D 11/1007; E05D 3/02; E05D 5/12; E05D 11/06; E05D 11/082; E05D 2003/027; E05D 11/1007
See application file for complete search history.

(56) References Cited

U.S. PATENT DOCUMENTS

| | | | | | |
|---|---|---|---|---|---|
| 2,872,697 | A * | 2/1959 | Hizsa, Jr. | E05D 11/082 | 16/342 |
| 3,255,484 | A * | 6/1966 | MacDonald | E05D 11/1014 | 16/278 |
| 3,346,910 | A * | 10/1967 | Dickinson | E05D 3/12 | 16/371 |
| 3,475,783 | A * | 11/1969 | Jorgensen | E05D 7/1061 | 16/385 |
| 3,577,840 | A * | 5/1971 | Buberniak | E05D 11/1014 | 16/332 |
| 3,822,440 | A * | 7/1974 | Stansbury, Jr. | E05D 11/1014 | 16/303 |
| 3,840,936 | A * | 10/1974 | Sato | E05D 11/1007 | 16/76 |
| 4,237,577 | A * | 12/1980 | Chapel | E05D 11/0027 | 16/388 |
| 4,819,299 | A * | 4/1989 | Holan | E05D 11/1014 | 16/296 |
| 4,891,862 | A * | 1/1990 | Holan | E05D 11/1014 | 16/334 |
| 4,949,427 | A * | 8/1990 | Keller | E05D 11/1057 | 16/377 |
| 5,075,928 | A * | 12/1991 | Bobrowski | E05D 5/06 | 16/382 |
| 5,491,873 | A * | 2/1996 | Ferguson | E05D 11/0027 | 16/388 |
| 5,666,695 | A * | 9/1997 | Jegers | E05D 7/1022 | 16/389 |
| 5,722,121 | A * | 3/1998 | Lau | E05D 5/128 | 16/389 |
| 5,867,869 | A * | 2/1999 | Garrett | E05D 15/54 | 16/334 |
| 6,083,010 | A * | 7/2000 | Daoud | E05D 11/0081 | 439/31 |
| 6,157,717 | A * | 12/2000 | Chintala | H04M 1/0216 | 379/433.13 |
| 6,230,365 | B1 * | 5/2001 | Lu | G06F 1/1679 | 16/337 |
| 6,470,532 | B2 * | 10/2002 | Rude | G06F 1/1681 | 16/338 |
| 6,966,150 | B2 * | 11/2005 | Chiang | E05D 5/0246 | 16/252 |
| 7,836,552 | B2 * | 11/2010 | Chao | G06F 1/1616 | 16/337 |
| 8,393,056 | B2 * | 3/2013 | Irwin | E05D 3/12 | 16/371 |
| 8,474,099 | B2 * | 7/2013 | Hung | G06F 1/1681 | 16/257 |
| 8,631,520 | B2 * | 1/2014 | Henne | A47K 13/12 | 16/337 |
| 8,671,521 | B2 * | 3/2014 | Irwin | E05D 3/12 | 16/308 |
| 9,388,616 | B2 * | 7/2016 | Cooper | E05D 5/065 | |
| 9,422,757 | B2 * | 8/2016 | Bacchetti | E05D 11/1028 | |
| 9,617,782 | B2 * | 4/2017 | Gramstad | E05D 5/04 | |
| 9,946,301 | B2 * | 4/2018 | Lan | F16C 11/04 | |
| 9,963,922 | B2 * | 5/2018 | Tsou | E05D 11/1007 | |
| 10,019,039 | B1 * | 7/2018 | Hsu | E05D 3/122 | |
| 10,221,598 | B2 * | 3/2019 | Dolman | E05D 11/0054 | |
| 10,544,611 | B2 * | 1/2020 | Nicholas, III | E05D 7/1005 | |
| 10,723,579 | B2 * | 7/2020 | Chang | B65D 43/164 | |
| 10,900,264 | B2 * | 1/2021 | Chang | G06F 1/181 | |
| 11,313,162 | B2 * | 4/2022 | Olkay | E05D 7/1061 | |
| 11,447,993 | B1 * | 9/2022 | Reger | E05D 3/02 | |
| 11,747,866 | B2 * | 9/2023 | Wang | G06F 1/1681 | 16/337 |
| 12,037,826 | B2 * | 7/2024 | Lin | E05D 11/08 | |
| 2007/0157433 | A1 * | 7/2007 | Lu | E05D 11/06 | 16/342 |
| 2009/0100640 | A1 * | 4/2009 | Chern | G06F 1/1681 | 16/277 |
| 2016/0047151 | A1 * | 2/2016 | Pelekanos | E05D 11/0054 | 16/237 |
| 2023/0002953 | A1 * | 1/2023 | Harbrecht | E05D 11/06 | |
| 2023/0167662 | A1 * | 6/2023 | Harbrecht | E05D 11/06 | 16/377 |
| 2024/0151085 | A1 * | 5/2024 | Lin | E05D 11/1028 | |
| 2024/0218584 | A1 * | 7/2024 | Harbrecht | D06F 39/14 | |

* cited by examiner

HINGE

CROSS-REFERENCE TO RELATED APPLICATIONS

This non-provisional application claims priority claim under 35 U.S.C. § 119(a) on Taiwan Patent Application No. 111142305 filed Nov. 4, 2022, the entire contents of which are hereby incorporated by reference.

BACKGROUND

Technical Field

This disclosure relates to a hinge, and in particular, to hinge with a simple structure and a small volume.

Related Art

A hinge structure is used to pivot the door panel to an edge of an opening of a case, such that the door panel can be flipped outward or closed to seal the case.

Usually, the hinge structure is unable to provide a restriction on the angle of flip of the door panel, and an additional angular limitation structure is required. However, an angular limitation structure usually becomes a protruding structure on the case, and through hole on the door panel is required to receive the angular limitation structure, such that it is difficult to maintain the flat appearance of the door panel. The additional angular limitation structure also increases the complexity of the overall structure, which in turn increases the difficulty of assembly and manufacturing costs.

Furthermore, when the door panel is closed to the case to seal the opening, the door panel and the case are combined by an additional snap mechanism to keep the door panel closed. However, when the door panel is flipped outward, the door panel is not fixed in the rotational direction, which makes the door panel easily shake in the opened state.

SUMMARY

In view of the above problems, this disclosure provides a hinge with a simple structure and a small volume, and is easy to be assembled and manufactured.

This disclosure provides a hinge including a seat, a shaft, a swivel bracket and at least one limiting bar. The seat includes two support portions. An accommodation area is defined between the two support portions. The two support portions are respectively provided with a shaft hole. The two shaft holes are arranged coaxially and connected to the accommodation area. The shaft includes a coupling section and two pivoting sections. The coupling section is located between the two pivoting sections. The two pivoting sections are respectively provided in one of the two shaft holes in a rotatable manner, and the coupling section is in the accommodation area. The swivel bracket includes a mounting plate, a sleeve piece and at least one extension portion. The mounting plate includes an inner surface, an outer surface, and a bottom edge. a sleeve piece, extending from the bottom edge of the mounting plate and is wound at a side corresponding to the inner surface. The sleeve piece is configured to be sleeved over and fixed to the coupling section, such that swivel bracket is fixed to the shaft and rotatable with respect to the seat to move the inner surface to face the accommodation area. The extension portion is adjacent to lateral edges of the sleeve piece and extends from the bottom edge and is bent towards the side corresponding to the inner surface. The limiting bar is disposed on one of the two support portions and is in the accommodation area. In a rotational path of the at least one extension portion and the mounting plate, the limiting bar is located between the at least one extension portion and the mounting plate to stop the mounting plate or the at least one extension portion.

In at least one embodiment, the two support portions are respectively provided with an upper plane, the upper planes of the two support portions are coplanar and are adjacent to two opposite edges of the accommodation area.

In at least one embodiment, a distance from the limiting bar to the upper plane is greater than the thickness of the mounting plate.

In at least one embodiment, the mounting plate further includes two lateral edges, the bottom edge is connected to the two lateral edges, and a distance between the two lateral edges is equal to or smaller than the distance between the two support portions.

In at least one embodiment, a cross-section of the coupling section is non-circular, and the sleeve piece encapsulates the coupling section.

In at least one embodiment, the seat further includes a connection portion, the connection portion is provided with a top surface, the two support portions extend over the top surface of the connection and are inclined, and an accommodation area is defined between the two support portions.

In at least one embodiment, one of the two support portions is provided with a slit, the slit communicates with the shaft hole, the hinge further includes an elastic arm located in the slit and fixed to the seat, and the elastic arm presses against the pivoting section.

In at least one embodiment, a lateral side of the pivoting section is provided with a mating plane, the mating plane is in parallel to an axial direction of the shaft and arranged corresponding to the slit.

In at least one embodiment, the elastic arm includes a fixing section and a pressing section, the fixing section is fixed to the seat, and the pressing section presses against the pivoting section.

In at least one embodiment, the seat is provided with an insertion hole and a fixation hole, the insertion hole is located on the bottom of the slit, the fixation hole overlaps the slit, the fixing section is configured to insert into the insertion hole, the fixation hole is provided for a fixation member to be disposed in the fixation hole and to press against the fixing section or the pressing section.

Through the above technical solution, the hinge of this disclosure has the feature of simple structure and small volume, which is conducive to reducing the production cost. Meanwhile, this angular limitation structure is configured on the inner surface of the mounting plate or disposed in the accommodation area. The angular limitation structure will not become a protruding structure on the outer surface of the mounting plate, which facilitates the installation of the mounting plate onto the door panel.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
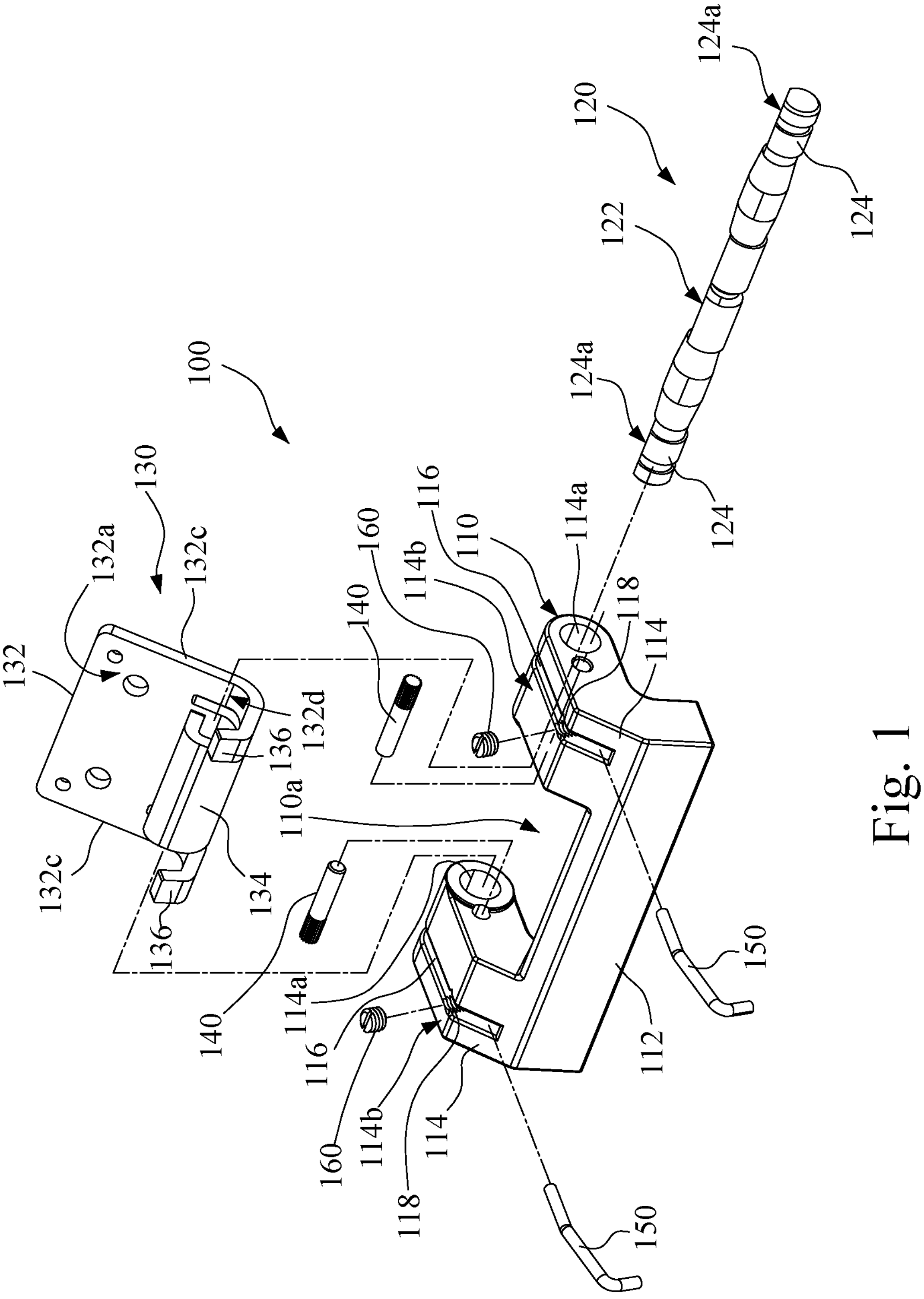
FIG. 1 is an exploded view of a hinge according to an embodiment of this disclosure.
Figure 2:
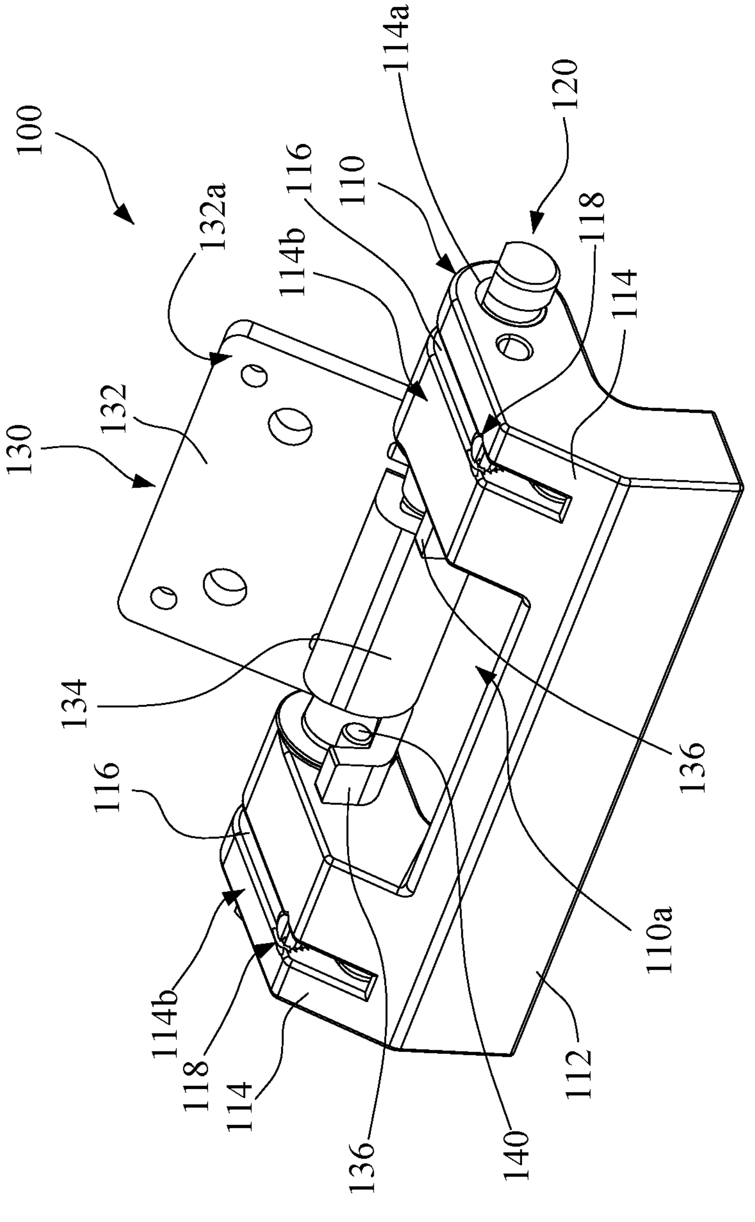
FIG. 2 is a perspective view of the hinge according to the embodiment of this disclosure.
Figure 3:
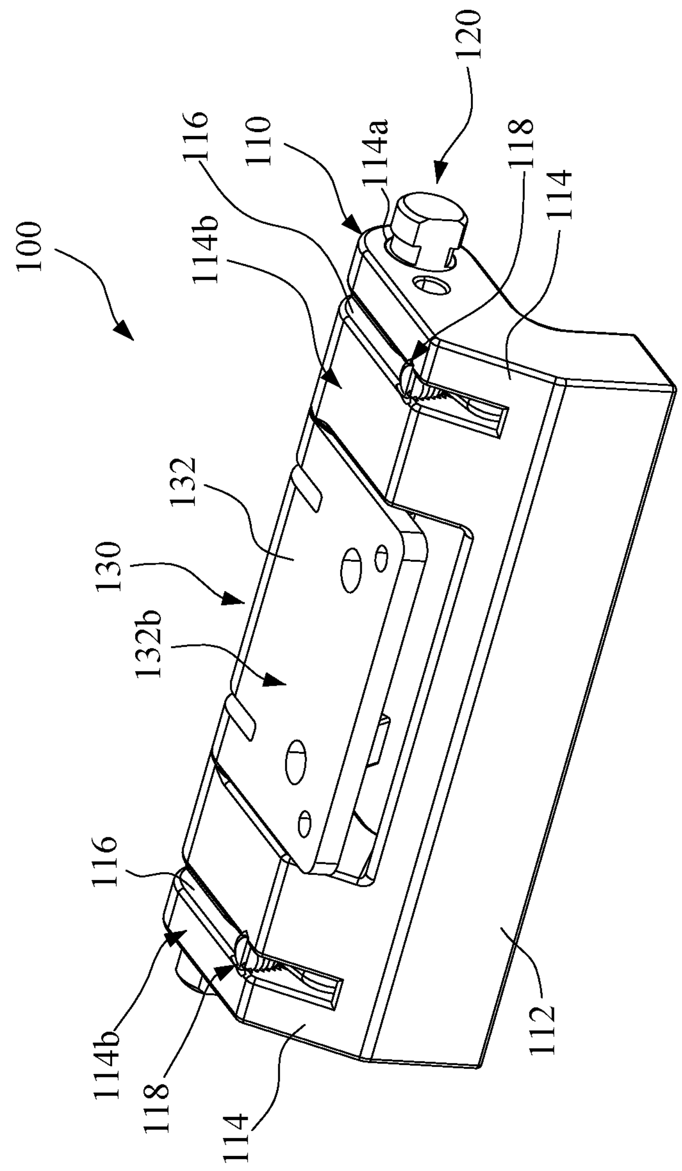
FIG. 3 is another perspective view of the hinge according to the embodiment of this disclosure.

Please refer to FIGS. 1, 2, 3, 4, and 5, a hinge 100 according to an embodiment of this disclosure includes a seat 110, a shaft 120, a swivel bracket 130, two limiting bars 140, and two elastic arms 150. As illustrated in FIG. 1, FIG. 2 and FIG. 3, The hinge 100 can be set individually, or plural hinges 100 can be set on a same axis. The hinge 100 is used to connect two objects, so that the two objects can be opened and closed relative to each other. For example, the two objects are a case 210 and a door panel 220, and the hinge 100 is configured to pivot the door panel 220 to the case 210. The seat 110 and the swivel bracket 130 are respectively connected to one of the case 210 and the door panel 220. The connection between the case 210 and the door panel 220 is not limited to one hinge 100, the connection can be made with more than two hinges 100.

As shown in FIGS. 1, 2, 4, and 5, The seat 110 is configured to be disposed on an edge of an opening 211 of the case 210, or the seat 110 is configured to be a part of the case 210 and is located at the edge of the opening 211. The seat 110 includes a connecting portion 112 and two support portions 114. the two support portions 114 extend over the top surface of the connection portion and are inclined, and an accommodation area 110*a* is defined between the two support portions 114. The two support portions 114 are respectively provided with a shaft hole 114*a*. and the two shaft holes 114*a* are arranged coaxially and the two shaft holes 114*a* are connected to the accommodation area 110*a*, so that the central axis of the shaft holes 114*a* passes through the accommodation area 110*a*. The two support portions 114 are respectively provided with an upper plane 114*b*, the upper planes 114*b* of the two support portions 114 are coplanar and are adjacent to two opposite edges of the accommodation area 110*a*.

As shown in FIGS. 1, 2, 4, and 5, The shaft 120 can be made of highly rigid material such as stainless steel. The shaft 120 is configured to insert in the two shaft holes 114*a* and passes through the accommodation area 110*a*. The shaft 120 includes a coupling section 122 and two pivoting sections 124. The coupling section 122 is located between the two pivoting sections 124; when the shaft 120 inserts into the two shaft holes 114*a* the coupling section 122 is in the accommodation area 110*a*. The two pivoting sections 124 are respectively provided in one of the two shaft holes 114*a* in a rotatable manner, and the shaft 120 can rotate with respect to the seat 110.

As shown in FIGS. 1, 2, 4, and 5, The swivel bracket 130 includes a mounting plate 132, a sleeve piece 134 and two extension portions 136. Specifically, the swivel bracket 130 is made by stamping a metal sheet, so that the mounting plate 132 is substantially in the form of a stamped sheet. The mounting plate 132 includes an inner surface 132*a*, an outer surface 132*b*, two lateral edges 132*c*, and a bottom edge 132*d*. The bottom edge 132*d* is connected to the two lateral edges 132*c*. A distance between the two lateral edges 132*c* is equal to or smaller than the distance between the two support portions 114, such that the mounting plate 132 can be accommodated in the accommodation area 110*a*. The sleeve piece 134 and the two extension portions 136 extends from the bottom edge 132*d*.

Figure 6:
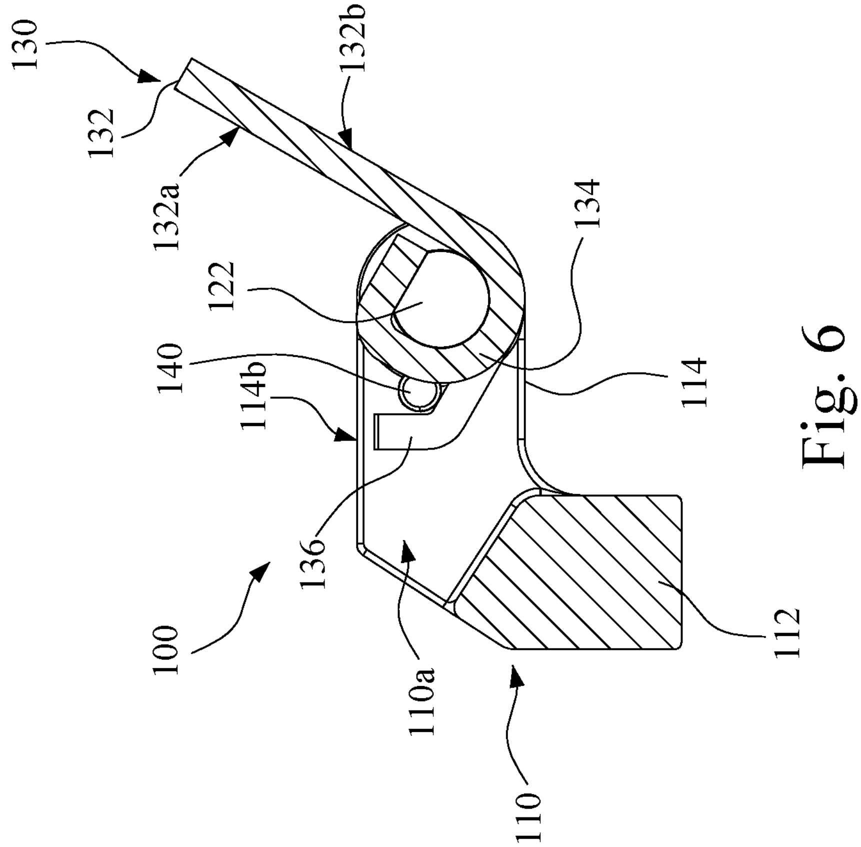
FIG. 6 is a cross-sectional view of the hinge according to the embodiment of this disclosure, showing the swivel bracket being flipped outward to a maximum angle.

As shown in FIG. 1 and FIG. 6, The sleeve piece 134 extends from the center of the bottom edge 132*d* of the mounting plate 132, and the sleeve piece 134 is wound inward towards the side corresponding to the inner surface 132*a*, and the sleeve piece 134 is bent towards the side close to the seat 110. The sleeve piece 134 is configured to be sleeved over and fixed to the coupling section 122 of the shaft 120, such that swivel bracket 130 is fixed to the shaft 120 to rotate together with shaft 120. Meanwhile, Meanwhile, by coupled to the shaft 120, the swivel bracket 130 can rotate with respect to the seat 110, so as to face the accommodation area 110*a* with the side 132*a*.

Please refer to FIGS. 2, 3, 4, and 5, The swivel bracket 130 is able to fit over the seat 110 and is located in the accommodation area 110*a*, and such that the mounting plate 132 is coplanar with the upper plane 114*b*; or the swivel bracket 130 is able to be flipped outward to form an included angle between the mounting plate 132 and the upper plane 114*b*. The outer surface 132*b* of the mounting plate 132, i.e., the side of the mounting plate 132 away from the seat 110, is configured to be fixed to an edge of the inner side of the door panel 220, such that the door panel 220 is pivoted to the case 210 by the hinge 100 to be flipped outward or to be closed to the case 210 to seal the opening 211.

Figure 4:
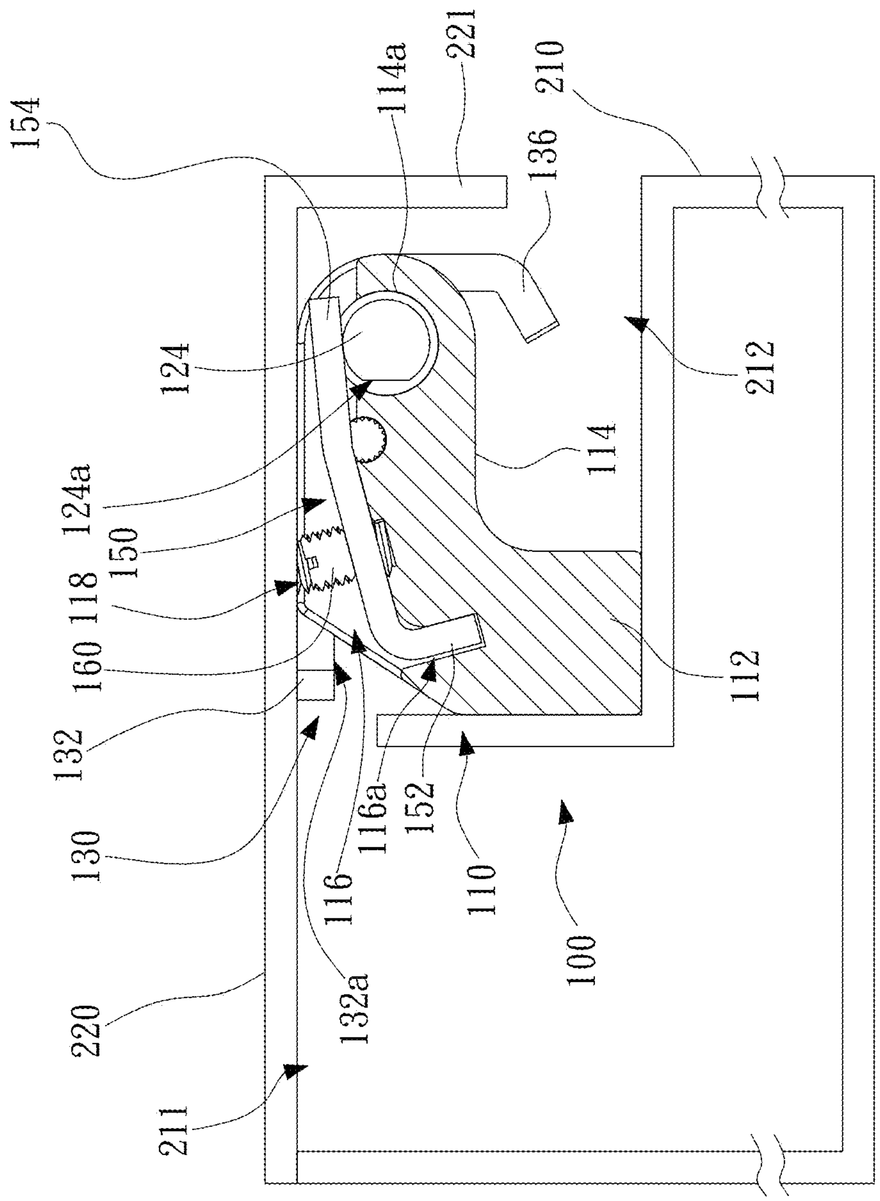
FIG. 4 is a cross-sectional view of the hinge, a case, and a door panel according to the embodiment of this disclosure, showing the door panel being closed.
Figure 5:
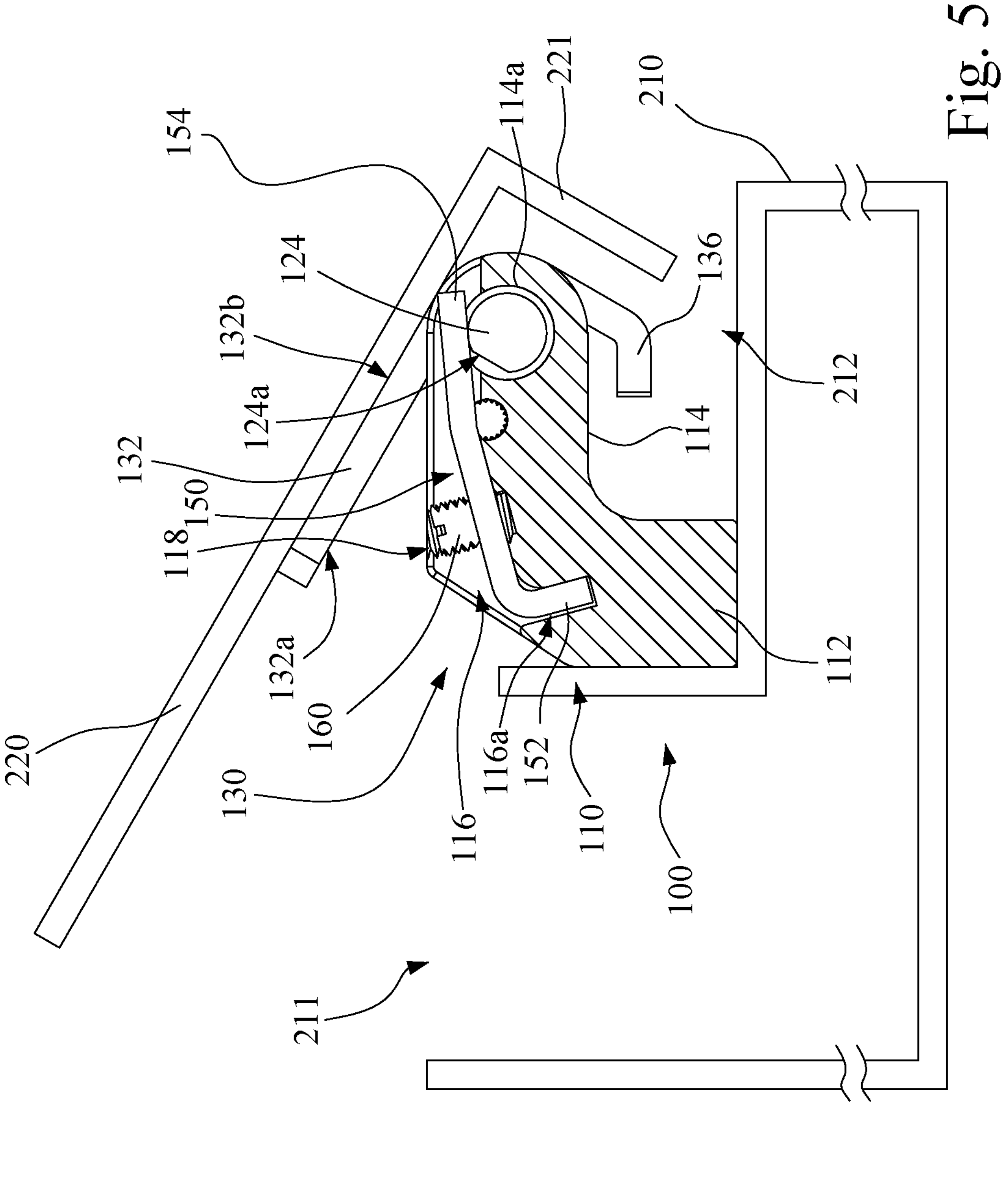
FIG. 5 is a cross-sectional view of the hinge, the case, and the door panel according to the embodiment of this disclosure, showing the door panel being flipped outward.

As shown in FIG. 4 and FIG. 5, The opening 211 is provided on one side of the case 210, and the case 210 is provided with a recessed portion 212 on this side. The recessed portion 212 is located at the edge of this side and adjacent to the opening 211. The side of the recessed portion 212 corresponding to the lateral side of the case 210 is open. The connection portion 112 of the seat 110 is fixed to the recessed portion 212 by screwing, riveting, or welding, and the support portion 114 is located at the edge of the opening 211. The outer surface 132*b* of the mounting plate 132 is fixed to the edge of the inner side of the door panel 220, and the edge of the door panel 220 further extend to form a lateral baffle 221. The lateral baffle 221 extends in the direction of the other side of the case 210, to shield the recessed portion 212 from the lateral surface of the case 210. The door panel 220 is fixed to the swivel bracket 130, and the swivel bracket 130 is combined with the seat 110 in a rotatable manner, such that the door panel 220 is pivoted to the case 210 by the seat 110 and the swivel bracket 130, to be flipped outward or to be closed to the case 210 to seal the opening 211.

As shown in FIG. 1 and FIG. 6, The cross-section of the coupling section 122 is in a non-circular configuration, e.g., D-shaped. The sleeve piece 134 encapsulates the coupling section 122, and the non-circular cross-section prevents the sleeve piece 134 from rotating with respect to the shaft 120. The cross-section of the coupling section 122 can also be rectangular, triangular, or other non-circular shape. Or the surface of the coupling section 122 is provided with an anti-slip pattern or convex and concave structures parallel to the axis, such that its cross-section is non-circular. In addition, in one embodiment, the sleeve piece 134 is fixed to the coupling section 122 by a fastener 160 such as a screw. The two extension portions 136 are respectively adjacent to two lateral edges of the sleeve piece 134 and extend from the bottom edge 132*d*. And the two extension portions 136 are bent towards the side corresponding to the inner surface 132*a*. When the swivel bracket 130 is closed to the seat 110, the extension portions 136 are bent towards the seat 110. Generally, the sleeve piece 134 is located at the center of the bottom edge 132*d*, and the two extension portions 136 extend from the bottom edge 132*d* and respectively located at two side of the sleeve piece 134.

As shown in FIG. 1 and FIG. 2, The two limiting bars 140 are respectively located in one of the two support portions 114 and are in the accommodation area 110*a*. The two limiting bars 140 are arranged coaxially and arranged in parallel to the shaft 120. The two limiting bars 140 are respectively provided corresponding to one of the two extension portions 136. Each of the limiting bars 140 is in a rotational path of the corresponding extension portion 136. When the swivel bracket 130 is flipped outward with respect to the seat 110, the extension portion 136 moves towards the limiting bar 136. As the swivel bracket 130 flipped outwards, the limit bar 140 can stop the extension portion 136 and limits the angle at which the swivel bracket 130 can be flipped out. In one or more embodiments, the hinge 100 is provided with only one limiting bar 140. At this time, the swivel bracket 130 is provided with one extension portion 136, that is, one extension 136 is located on one side of the sleeve piece 134.

As shown in FIGS. 1, 2, 4, and 5, the two support portions 114 are respectively provided with a slit 116. Each of the slits 116 communicates with the corresponding shaft hole 114*a*, and the two pivoting sections 124 are respectively provided with one of the two slits 116. In one or more embodiments, the slit 116 is in the upper plane 114*b* and perpendicular to the shaft hole 114*a*. The elastic arm 150 is in the slit 116 and is fixed to the seat 110. The elastic arm 150 presses against the pivoting section 124 of the shaft 120.

As shown in FIG. 4 and FIG. 5, In an example, the elastic arm includes a fixing section 152 and a pressing section 154. An included angle is defined between the fixing section 152 and the pressing section 154. The seat 110 is further provided with an insertion hole 116*a* and a fixation hole 118. The insertion hole 116*a* is located on the bottom of the slit 116, and the fixation hole 118 is provided at the fixation hole 114*b* and overlaps the slit 116. The fixing section 152 is configured to insert the insertion hole 116*a* to fix to the seat 110. The fixation hole 118 is configured for the fixation hole 160 to insert therein, and the fixation member 160 presses against the fixing section 152 or the pressing section 154, such that the elastic arm 150 is forced to press against the pivoting section 124 of the shaft 120. In an example, the fixation hole 118 is a screw hole while the fixation member is a bolt.

As shown in FIGS. 1, 4, and 5, a lateral side of the pivoting section 124 is provided with a mating plane 124*a*, and the mating plane is in parallel to an axial direction of the shaft 120 and arranged corresponding to the slit 116. The mating plane 124*a* of the two pivoting section 12 may be parallel to each other or may have an included angle defined therebetween. After the shaft 120 rotating, the elastic arm 150 presses against the mating plane 124*a*, to interfere with the shaft 120 to provide a positioning effect.

In this disclosure, the hinge 100 is provided with only one elastic arm 150. At this time, only one of the two support portions 114 has to be provided with a slit 116, and only one of the two pivoting sections 124 has to be provided with a mating plane 124*a*.

As shown in FIG. 4, FIG. 5 and FIG. 6, the extension portions 136 are bent towards the seat 110, and the sleeve piece 134 is bent towards the inner surface 132*a* of the mounting plate 132. Therefore, the angular limitation structure will not become a protruding structure on the outer surface 132*b* of the mounting plate 132, which facilitates the installation of the mounting plate 132 onto the door panel 220. Furthermore, the sleeve piece 134 and the extension portions 136 are structures extending from the mounting plate 132, which can simplify structure of the swivel bracket 130 and reduce the manufacturing cost.

Figure 7:
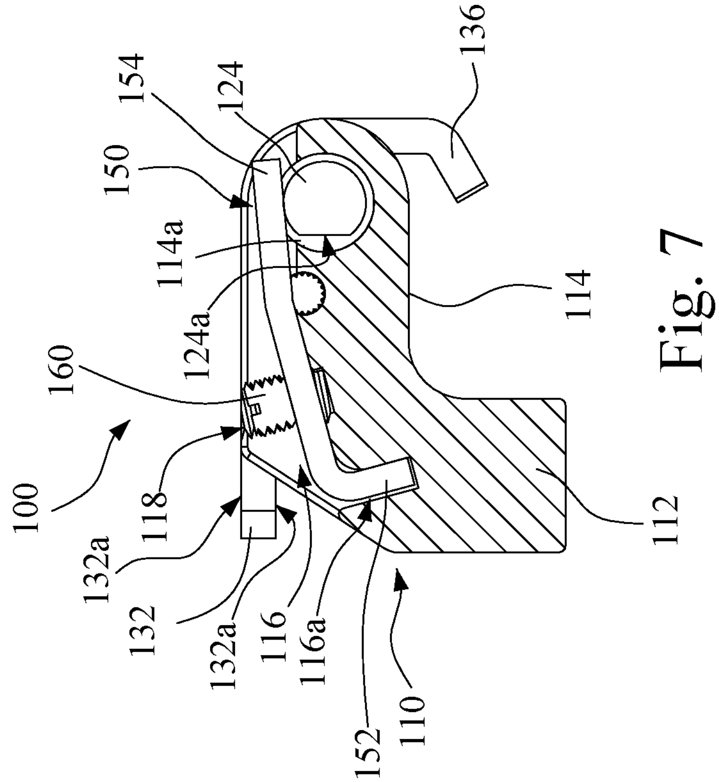
FIG. 7 is a cross-sectional view of the hinge according to the embodiment of this disclosure, showing the swivel bracket being closed.
Figure 8:
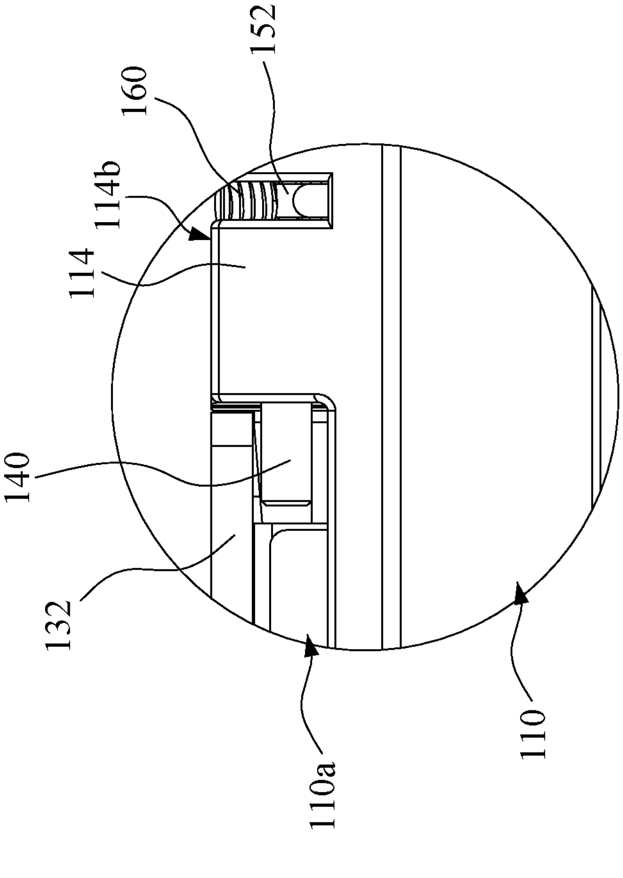
FIG. 8 is a partial front view of the hinge according to the embodiment of this disclosure.

As shown in FIG. 7 and FIG. 8, When the swivel bracket 130 is closed to the seat 110, the mounting plate 132 is accommodated in the accommodation area 110*a*. At this time, the door panel 220 fixed to the outer surface 132*b* of the mounting plate 132 abuts against the upper plane 114*b*. In an example, a distance from the limiting bar 140 to the upper plane 114*b* is greater than the thickness of the mounting plate 132. Therefore, the limiting bar 140 will not interfere with the mounting plate 132 in closed state, such that the mounting plate 132 is able to be fully received in the accommodation area 110*a* to have the door panel 220 abut against the setting upper plane 114*b* without tilting outwards.

Figure 9:
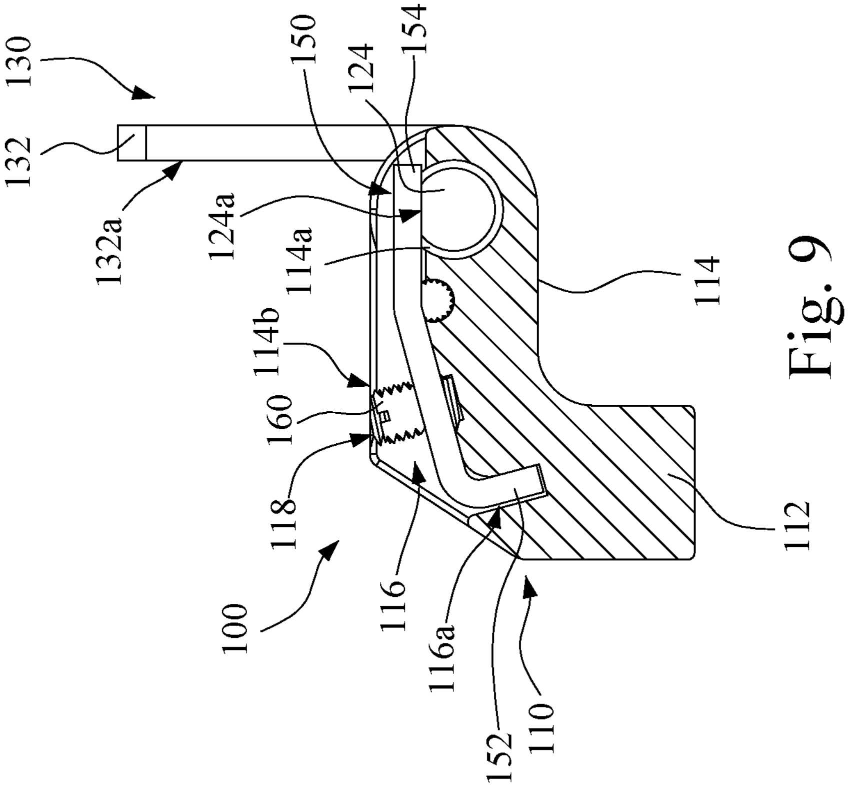
FIG. 9 is a cross-sectional view of the hinge according to the embodiment of this disclosure, showing the swivel bracket being positioned at a predetermined angle.

As shown in FIG. 9, when the swivel bracket 130 is flipped outwards to a predetermined angle, for example, the angle between the mounting plate 132/door panel 220 and the upper plane 114*b* is 90 degrees, the elastic arm 150 abuts against the mating plane 124*a* to interfere with the shaft 120 to provide a positioning effect. At this time, the swivel bracket 130 and the door panel 220 are positioned at this predetermined angle.

Figure 10:
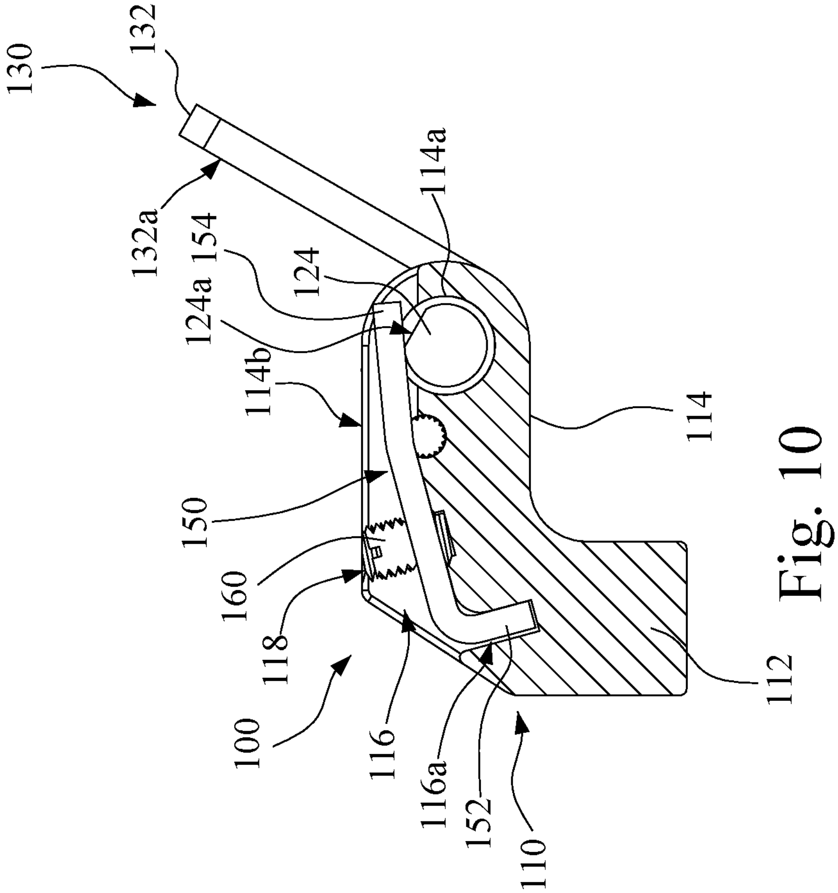
FIG. 10 is a cross-sectional view of the hinge according to the embodiment of this disclosure, showing the swivel bracket being flipped outward to a maximum angle.

As shown in FIG. 6 and FIG. 10, when the swivel bracket 130 is further flipped outwards to a maximum angle, for example, the angle between the mounting plate 132/door panel 220 and the upper plane 114*b* is 120 degrees. The spring arm 150 is detached from the mating plane 124*a*, and the extension portions 136 of the swivel bracket 130 abut against the limiting bar 140, such that the angle at which the swivel bracket 130/door panel 220 flips outwards is limited to this maximum angle.

Figure 11:
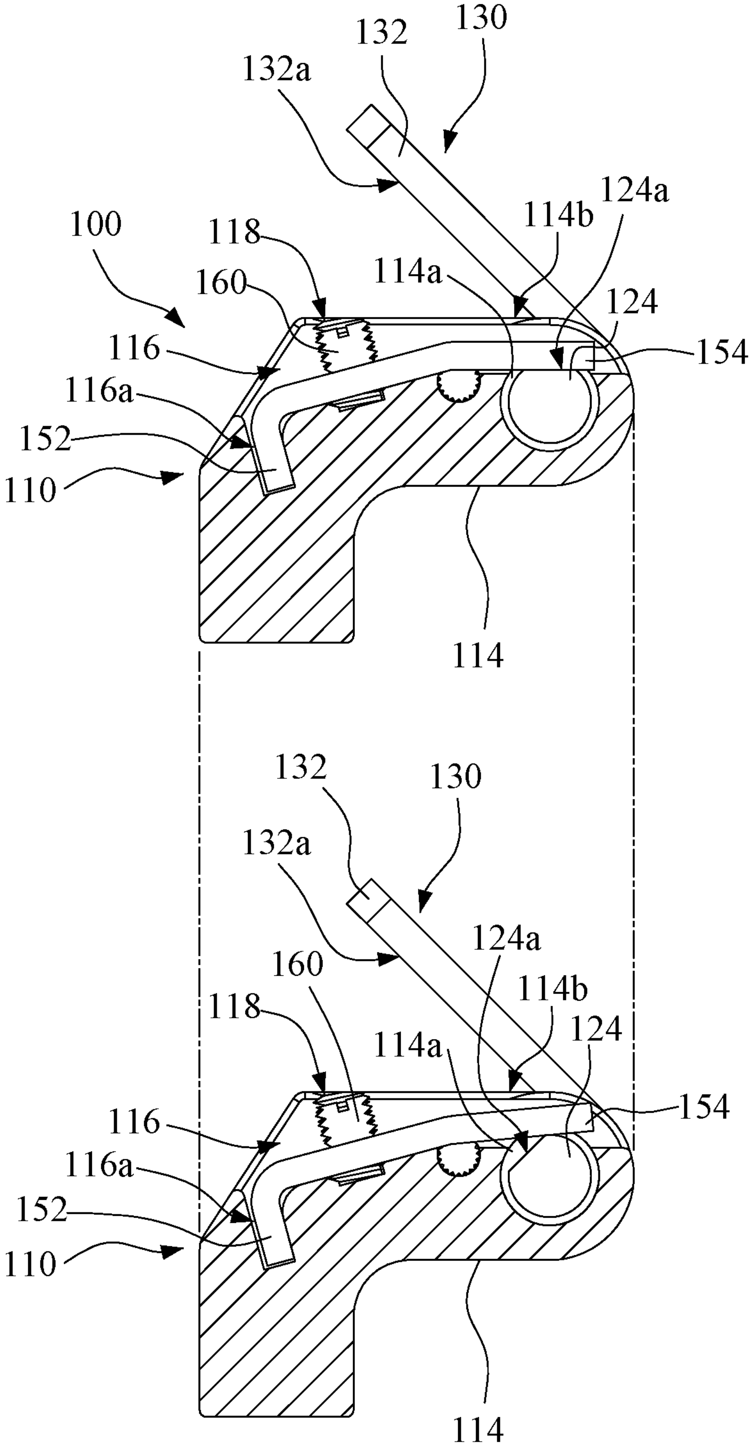
FIG. 11 is a cross-sectional view of the hinge according to another embodiment of this disclosure, showing the swivel bracket being positioned at a first predetermined angle.
Figure 12:
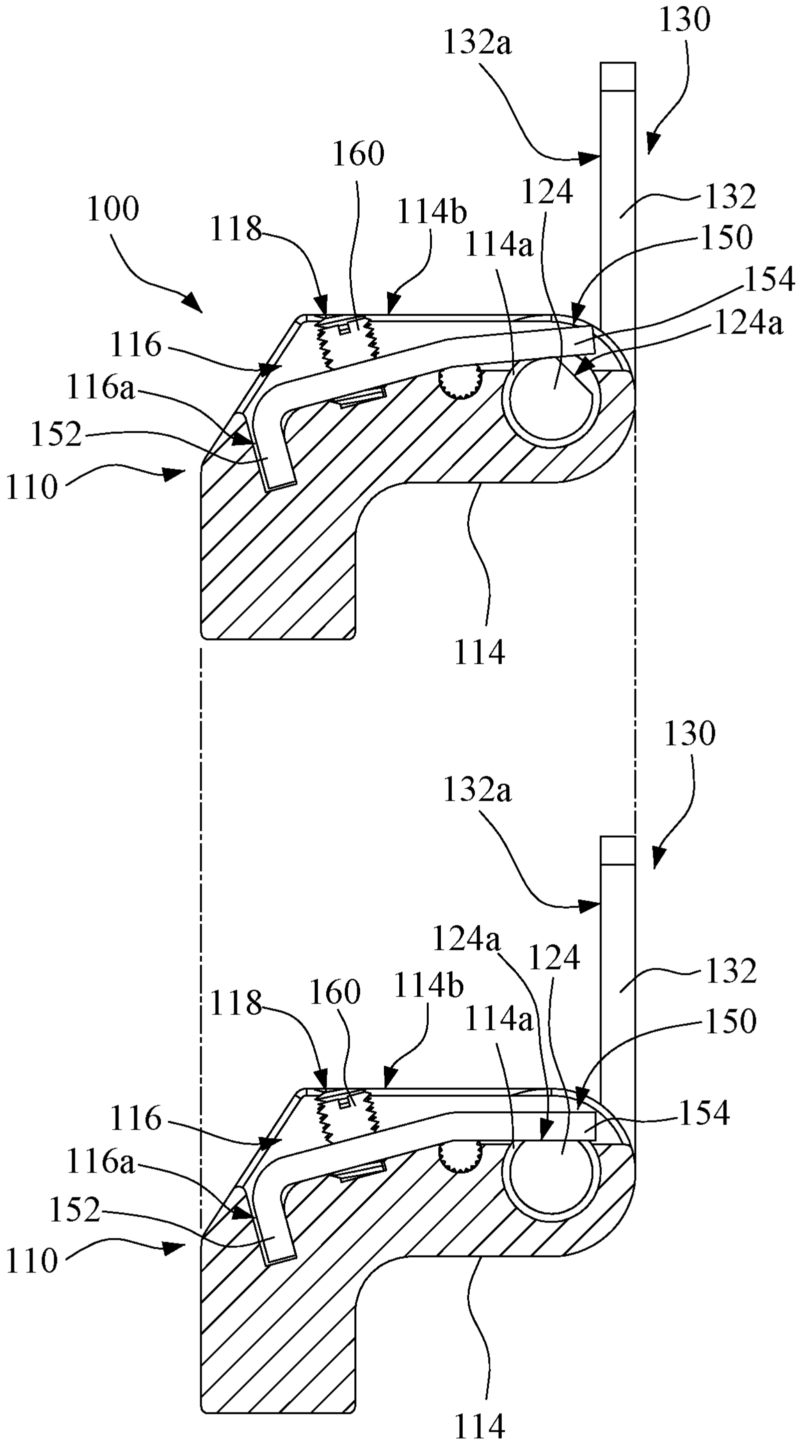
FIG. 12 is a cross-sectional view of the hinge according to another embodiment of this disclosure, showing the swivel bracket being positioned at a second predetermined angle.

The above angle values are for example only and is not intended to as shown in FIG. 11 and FIG. 12, in another embodiment of this disclosure, The two mating planes 124*a* are not parallel, and an angle is defined between the two mating planes 124*a*, such that the swivel bracket 130 and the door panel 220 are able to be positioned at two different predetermined angles.

As shown in FIG. 11, when the swivel bracket 130 is flipped outwards to a first predetermined angle, for example, the angle between the mounting plate 132/swivel bracket 130 and the upper plane 114*b* is 45 degrees, one of the two elastic arms 150 abuts against the corresponding mating plane 124*a*, and the other elastic arm 150 does not abut against the corresponding mating plane 124*a*. At this time, the swivel bracket 130 and the door panel 220 are positioned at this first predetermined angle.

As shown in FIG. 12, when the swivel bracket 130 is flipped outwards to a second predetermined angle, for example, the angle between the mounting plate 132/swivel bracket 130 and the upper plane 114*b* is 90 degrees, one of the two elastic arms 150 is detached from the corresponding mating plane 124*a*, and the other elastic arm 150 abuts against its corresponding mating plane 124*a*. At this time, the swivel bracket 130 and the door panel 220 are positioned at this second predetermined angle.

Through the above technical solution, the hinge 100 of this disclosure has the feature of simple structure and small volume, which is conducive to reducing the production cost. Meanwhile, this angular limitation structure is configured on the inner surface 132*a* of the mounting plate 132 or disposed in the accommodation areal 10*a*. Therefore, the angular limitation structure will not become a protruding structure on the outer surface 132*b* of the mounting plate 132, which facilitates the installation of the mounting plate 132 onto the door panel 220.

What is claimed is:

1. A hinge comprising:

- a seat, including two support portions; wherein an accommodation area is defined between the two support portions, the two support portions are respectively provided with a shaft hole; and the two shaft holes are arranged coaxially and connected to the accommodation area;
- a shaft, including a coupling section and two pivoting sections; wherein the coupling section is located between the two pivoting sections; the two pivoting sections are respectively provided in one of the two shaft holes in a rotatable manner, and the coupling section is in the accommodation area;
- a swivel bracket, including:
  - a mounting plate, including an inner surface, an outer surface, and a bottom edge;
  - a sleeve piece, extending from the bottom edge of the mounting plate and bent around towards the inner surface; wherein the sleeve piece is configured to be sleeved over and fixed to the coupling section, such that swivel bracket is fixed to the shaft and rotatable with respect to the seat to move the inner surface to face the accommodation area; and
  - at least one extension portion, adjacent to lateral edges of the sleeve piece and extends from the bottom edge, and bent towards the side corresponding to the inner surface; and
- a limiting bar, disposed on one of the two support portions and located in the accommodation area, and arranged in parallel to the shaft; wherein the at least one limiting bar is located in a rotational path of the at least one extension portion, when the swivel bracket is flipped outward with respect to the seat the at least one extension portion moves towards the at least one limiting bar.

2. The hinge as claimed in claim 1, wherein the two support portions are respectively provided with an upper plane, the upper planes of the two support portions are coplanar and are adjacent to two opposite edges of the accommodation area.

3. The hinge as claimed in claim 2, wherein a distance from the limiting bar to the upper plane is greater than the thickness of the mounting plate.

4. The hinge as claimed in claim 1, wherein the mounting plate further includes two lateral edges, the bottom edge is connected to the two lateral edges, and a distance between the two lateral edges is equal to or smaller than the distance between the two support portions.

5. The hinge as claimed in claim 1, wherein a cross-section of the coupling section is non-circular, and the sleeve piece encapsulates the coupling section.

6. The hinge as claimed in claim 1, wherein the seat further includes a connection portion, the connection portion is provided with a top surface, the two support portions extend over the top surface of the connection portion and are inclined, and the accommodation area is defined between the two support portions.

7. The hinge as claimed in claim 1, wherein one of the two support portions is provided with a slit, the slit communicates with the shaft hole, the hinge further includes an elastic arm located in the slit and fixed to the seat, and the elastic arm presses against the pivoting section.

8. The hinge as claimed in claim 7, wherein a lateral side of the pivoting section is provided with a mating plane, the mating plane is in parallel to an axial direction of the shaft and arranged corresponding to the slit.

9. The hinge as claimed in claim 7, wherein the elastic arm includes a fixing section and a pressing section, the fixing section is fixed to the seat, and the pressing section presses against the pivoting section.

10. The hinge as claimed in claim 9, wherein the seat is provided with a insertion hole and a fixation hole, the insertion hole is located on the bottom of the slit, the fixation hole overlaps the slit, the fixing section is configured to insert into the insertion hole, the fixation hole is provided for a fixation member to be disposed in the fixation hole and to press against the fixing section or the pressing section.

* * * * *